(12) United States Patent
Reynaud et al.

(10) Patent No.: US 12,109,513 B2
(45) Date of Patent: Oct. 8, 2024

(54) ION-EXCHANGE SYSTEM FOR TREATING A FLUID AND AN ION CHROMATOGRAPHY METHOD THEREOF

(71) Applicant: WEST INVEST SA, Luxembourg (LU)

(72) Inventors: Eric Reynaud, Luxembourg (LU); Eric Decanini, Chateauneuf-le-Rouge (FR)

(73) Assignee: WEST INVEST SA, Luxembourg (LU)

( * ) Notice: Subject to any disclaimer, the term of this patent is extended or adjusted under 35 U.S.C. 154(b) by 585 days.

(21) Appl. No.: 17/260,284

(22) PCT Filed: May 22, 2019

(86) PCT No.: PCT/IB2019/054234
§ 371 (c)(1),
(2) Date: Jan. 14, 2021

(87) PCT Pub. No.: WO2020/030988
PCT Pub. Date: Feb. 13, 2020

(65) Prior Publication Data
US 2021/0291076 A1    Sep. 23, 2021

Related U.S. Application Data

(60) Provisional application No. 62/716,503, filed on Aug. 9, 2018.

(51) Int. Cl.
*B01D 15/22*     (2006.01)
*B01D 15/36*     (2006.01)
(Continued)

(52) U.S. Cl.
CPC .......... *B01D 15/22* (2013.01); *B01D 15/363* (2013.01); *B01J 41/07* (2017.01); *B01J 41/13* (2017.01);
(Continued)

(58) Field of Classification Search
CPC .......... C02F 1/42; B01D 15/22; B01D 15/361; B01D 15/363; B01D 15/14; B01J 47/022; B01J 47/04
(Continued)

(56) References Cited

U.S. PATENT DOCUMENTS

| | | |
|---|---|---|
| 3,575,294 A | 4/1971 | Hirowatari |
| 3,642,205 A | 2/1972 | Marty |

(Continued)

FOREIGN PATENT DOCUMENTS

| | | | |
|---|---|---|---|
| EP | 0497632 A1 | * | 8/1992 |
| EP | 0551002 A1 | | 7/1993 |
| WO | 2016046834 A1 | | 3/2016 |

OTHER PUBLICATIONS

International Search Report for corresponding application PCT/IB2019/054234 filed May 22, 2019; Mail date Dec. 2, 2019.
(Continued)

*Primary Examiner* — Claire A Norris
(74) *Attorney, Agent, or Firm* — CANTOR COLBURN LLP

(57) ABSTRACT

A container for treating a fluid with an ion-exchange system is provided. The container includes a housing extending in an upright position between a bottom port and an opposed top port. The housing has an internal chamber. A bottom plate is disposed in the internal chamber above the bottom port and having a plurality of openings defined therethrough. The bottom plate divides the internal chamber between a main chamber and a bottom chamber. The bottom chamber is defined between the bottom plate and the bottom port. A plurality of diffusers extend from the bottom plate into the main chamber. Each one of the plurality of diffusers has a diffuser tube section projecting upwardly from the bottom plate and in fluid flow communication with the bottom chamber. The diffuser tube section has radial openings
(Continued)

circumferentially distributed along a length thereof to radially discharge the fluid in the main chamber.

9 Claims, 6 Drawing Sheets

(51) Int. Cl.
  *B01J 41/07* (2017.01)
  *B01J 41/13* (2017.01)
  *B01J 47/022* (2017.01)
  *B01J 47/04* (2006.01)
  *G01N 30/60* (2006.01)
(52) U.S. Cl.
  CPC ............. *B01J 47/022* (2013.01); *B01J 47/04* (2013.01); *G01N 30/6069* (2013.01)

(58) Field of Classification Search
  USPC .......................... 210/266, 264, 287.288, 290
  See application file for complete search history.

(56) References Cited

U.S. PATENT DOCUMENTS 3,802,568 A * 4/1974 Plura .................. B01J 47/10
                                                    210/287
2017/0239600 A1   8/2017 Chen

OTHER PUBLICATIONS

Written Opinion of the International Searching Authority for corresponding application PCT/IB2019/054234 filed May 22, 2019; Mail date Dec. 2, 2019.

\* cited by examiner

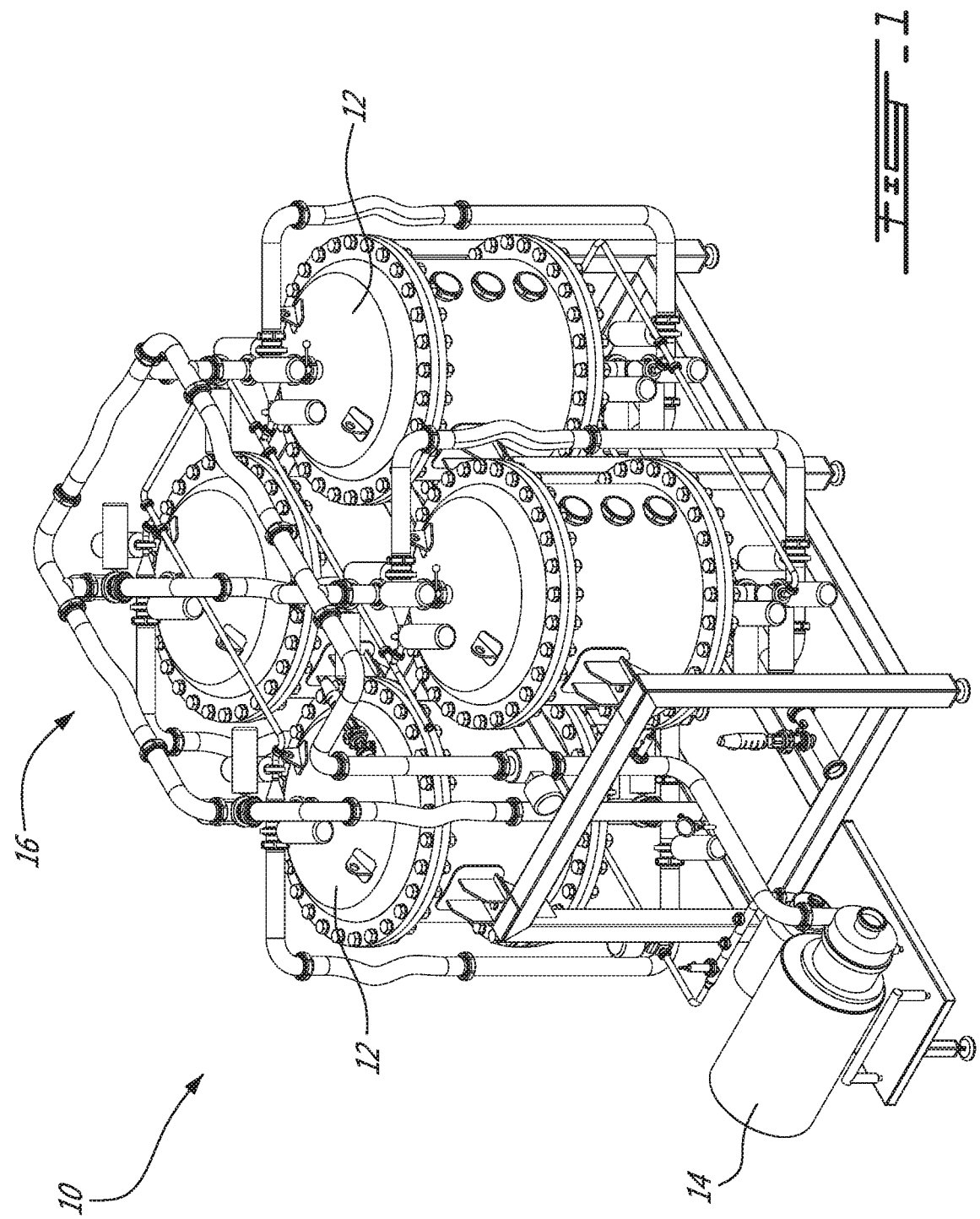

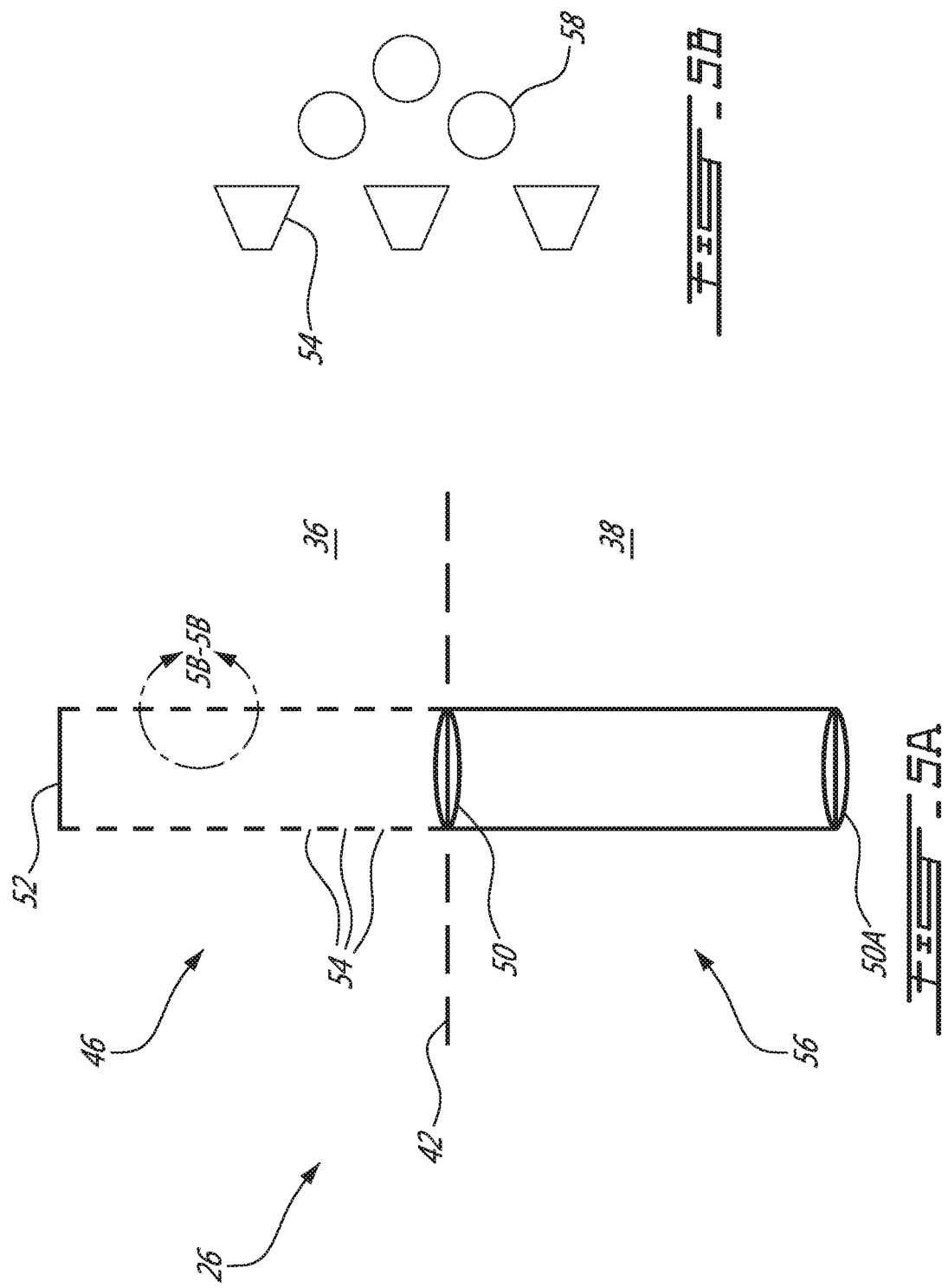

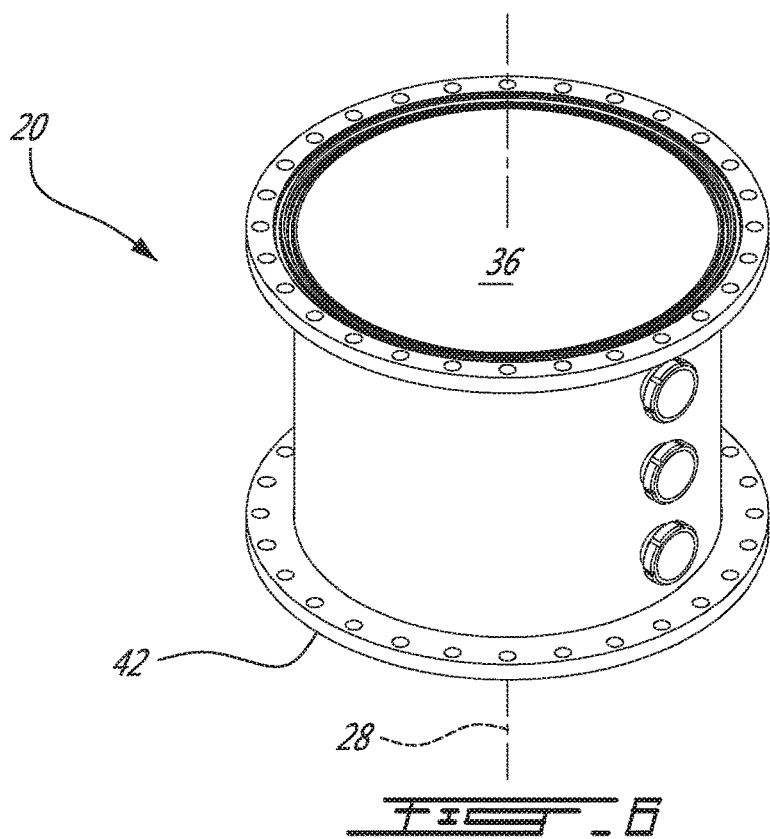
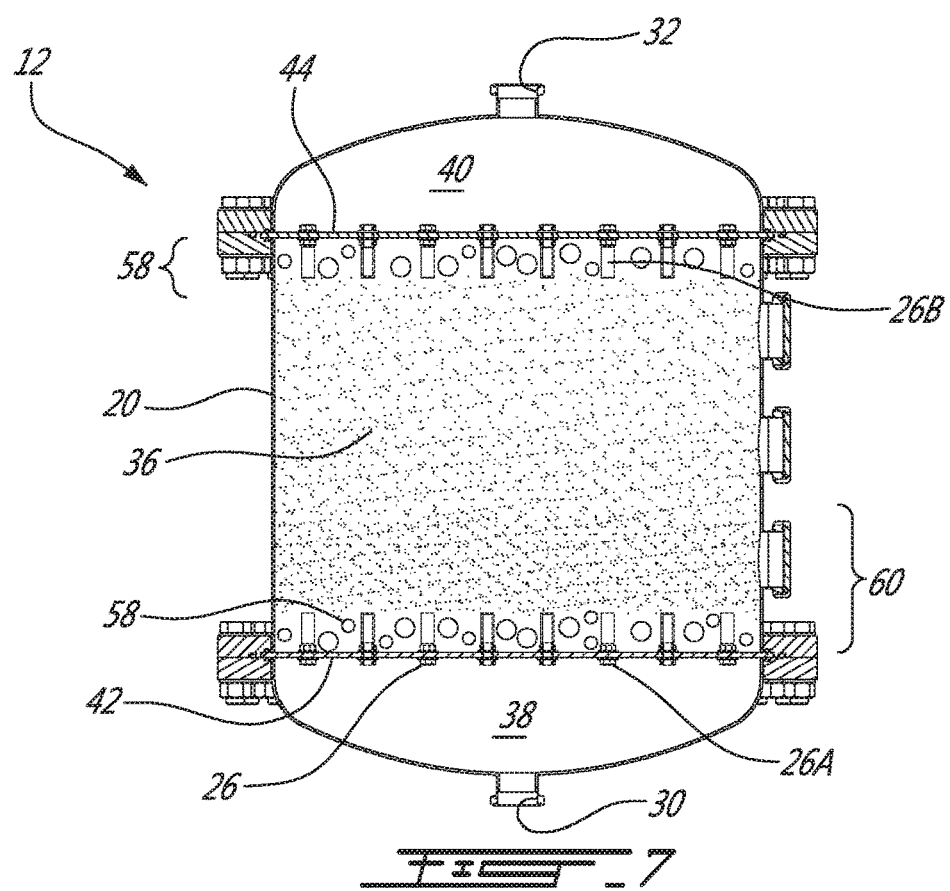

ION-EXCHANGE SYSTEM FOR TREATING A FLUID AND AN ION CHROMATOGRAPHY METHOD THEREOF

CROSS REFERENCE TO RELATED APPLICATION

This application claims the benefit of U.S. 62/716,503 filed on Aug. 9, 2018, the content of which is incorporated herein by reference in its entirety.

TECHNICAL FIELD

The application relates generally to ion chromatography and, more particularly, to an ion-exchange system and method thereof.

BACKGROUND OF THE ART

Ion exchanger systems, such as those employed in ion chromatography, can be used to remove or separate molecules from a fluid. The fluid may pass upwardly through a bed of ion-exchange resin contained in a container of the ion exchanger system to remove the molecules from the fluid. The ion exchanger system typically has an inlet at the bottom to receive the fluid into the container and an outlet at the top to remove the fluid from the container. In operation, the fluid can be pressurized and injected into the container.

The amount of molecules removed from the fluid may depend on the time that the fluid is in contact with the bed of ion-exchange resin. However, a portion of the fluid may pass through the resin at a rate different from rates of other portions of the fluid passing through the resin.

SUMMARY

In one aspect, there is provided a container for treating a fluid with an ion-exchange system, the container comprising a housing extending in an upright position along a longitudinal axis between a bottom port and an opposed top port, the housing having an internal chamber defined therein; a bottom plate disposed in the internal chamber perpendicular to the longitudinal axis at a predetermined height above the bottom port and having a plurality of openings defined therethrough, the bottom plate dividing the internal chamber between a main chamber and a bottom chamber, the bottom chamber defined between the bottom plate and the bottom port; and a plurality of diffusers in fluid flow communication with the bottom chamber extending from the bottom plate into the main chamber, each one of the plurality of diffusers being received in a respective one of the plurality of openings of the bottom plate and having a diffuser tube section projecting upwardly from the bottom plate and being in fluid flow communication with the bottom chamber, the diffuser tube section having radial openings circumferentially distributed along a length thereof to radially discharge the fluid in the main chamber.

In another aspect, there is provided an ion-exchange system for treating a fluid to remove particles, the ion-exchange system comprising a container extending in an upright position along a longitudinal axis between a bottom port and an opposed top port, the container having an internal chamber between the bottom port and the top port; top and bottom plates disposed in the internal chamber of the container, a bottom chamber defined between the bottom port and the bottom plate, a top chamber defined between the top plate and the top port, and a main chamber defined between the top and bottom plates; treatment particles disposed in the internal chamber to treat the fluid, the treatment particles including a bed of silex particles disposed on the bottom plate and a bed of ion-exchange particles disposed on top of the bed of silex particles; and a plurality of bottom diffusers extending through the bottom plate, each one of the plurality of bottom diffusers having a diffuser tube section projecting into the bed of silex particles, the diffuser tube section having a root opening at a first end thereof in fluid flow communication with the bottom chamber and a closed second end opposite the first end, and radial diffuser openings circumferentially distributed along a length of the diffuser tube section to radially discharge the fluid in the main chamber and to uniformly distribute the fluid in the bed of silex particles, wherein the top chamber is free of the treatment particles above the top plate and the bottom chamber is free of the treatment particles below the bottom plate relative to the longitudinal axis.

In a further aspect, there is provided an ion-exchange system for treating a fluid to remove particles, the ion-exchange system comprising a container section having a cylindrical shape and extending along a longitudinal axis between a bottom plate and a top plate, each one of the bottom and top plates having a plurality of openings defined therethrough the container section having a main chamber defined therein between the bottom plate and the top plate, the container section having a height along the longitudinal axis and a diameter extending in a plane perpendicular to the longitudinal axis, and a ratio of the height over the diameter is between 0.75 and 1.25; and a plurality of bottom diffusers extending through the bottom plate, each one of the plurality of bottom diffusers having a diffuser tube section projecting into the main chamber parallel to the longitudinal axis through a respective one of the plurality of openings of the bottom plate, each one of the plurality of bottom diffusers having a root tube section adapted to be in fluid flow communication with a source of the fluid, and radial diffuser openings circumferentially distributed along a length of the diffuser tube section to radially discharge the fluid in the container section, a density of the plurality of bottom diffusers being between 50 and 70, the density of the plurality of bottom diffusers being defined as a number of the plurality of bottom diffusers per meter square of the bottom plate.

In a further aspect, there is provided an ion chromatography method for treating a fluid with ion-exchange treatment particles disposed in a container, the method comprising uniformly distributing the fluid in a bed of silex particles of the treatment particles through a plurality of bottom diffusers; raising the fluid from the bed of silex particles into, and through, a bed of ion-exchange particles of the treatment particles; and evacuating the fluid from the container.

DESCRIPTION OF THE DRAWINGS

Reference is now made to the accompanying figures in which:

FIG. 1 is a perspective view of an ion-exchange system including four containers;

FIG. 5A is one of the diffusers of FIG. 2C;

FIG. 5B is an enlarged view of a portion of the diffuser;

FIG. 6 is a housing of the container; and

FIG. 7 is a cross-sectional view of the container.

DETAILED DESCRIPTION

Figure 2A:
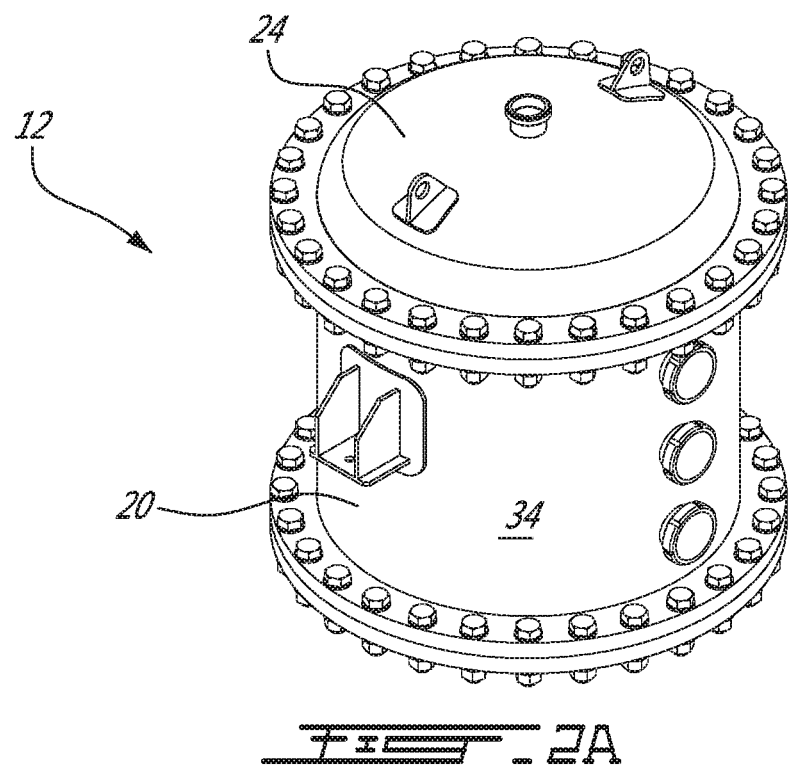
FIG. 2A is a perspective view of one of the containers shown in FIG. 1.

FIG. 1 illustrates an ion-exchange system 10 that may be used in ion chromatography. The ion-exchange system 10 may be used for treating a fluid to remove ions, particles, and/or molecules from the fluid. The ion-exchange system may be used in the food and beverage industry as part of a purification and separation system. For example, the ion-exchange system 10 may be used in juice debittering, juice clarification, and the like. It is understood that other suitable applications outside the beverage industry for removing ions, particles and/or molecules from the fluid using the ion-exchange system 10 are also contemplated.

In the embodiment shown in FIG. 1, the ion-exchange system 10 includes four containers 12. The container 12 is intended to refer to a vessel, receptacle, tank, and the like. The container 12 may receive and treat the fluid with treatment particles that may be disposed therein.

The treatment particles may contain a bed of ion-exchange particles or resin to treat the fluid. The ion-exchange particles are intended to refer to resins, beads, or the like, that can separate ions and/or molecules from the fluid. The ion-exchange resin may be selected to provide the desired separation and removal of the ions and/or molecules from the fluid.

The ion-exchange particles or resin to treat the fluid is preferably a weak anion exchange resin such as a resin of the acrylic or styrene type. Preferably, weak anion exchange resin is comprising ternary amines that are neutral at a pH greater than 10 and ionized at a pH lower than 10 and may therefore be useful for capturing chemical species (such as weak acids, in particular organic acids). Preferably, the resin is an acrylic-type anion exchange resin having a capacity between 1.6-3.2.

The container 12 may include any suitable material for containing the fluid and the treatment particles. The ion-exchange system may include a pump 14 to pressurize the fluid and a piping network 16 to carry the fluid into and out of the containers 12.

Figure 2B:
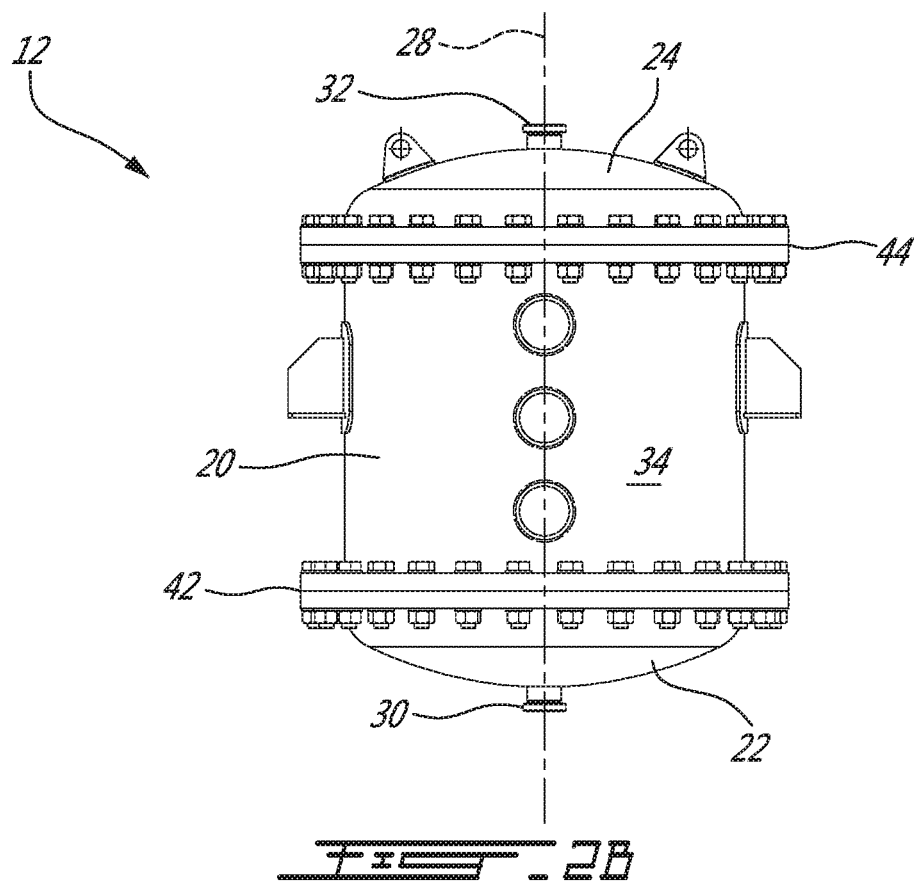
FIG. 2B is a front view of the container of FIG. 2A.
Figure 2C:
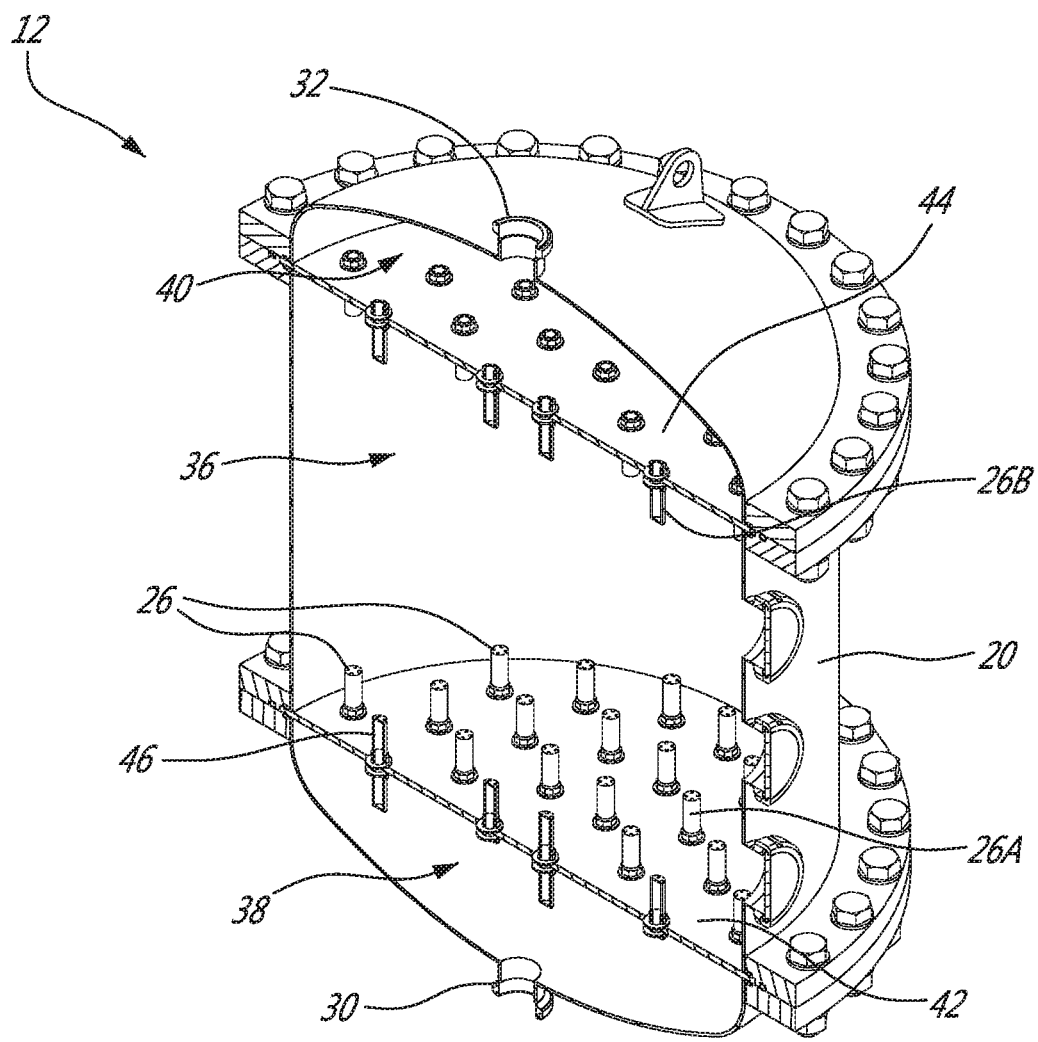
FIG. 2C is perspective cross-sectional view of the container, showing diffusers disposed inside the container.

FIGS. 2A-2C, illustrates the container 12. The container 12 has a housing 20 to receive the treatment particles, a bottom cover 22, an opposed top cover 24, and diffusers 26 positioned inside the container 12 to distribute the fluid in the housing 20. The fluid may be uniformly distributed across the housing 20 through the diffusers 26. It will be appreciated that relative terms such as, "top", "bottom", "side", "horizontal", "vertical", "upright", "above", and the like are used herein to describe one element's relationship to another element as illustrated in the figures. It is understood that these relative terms are intended to encompass different orientations of the elements in addition to the orientation depicted in the figures.

The housing 20 may extend in an upright position along a longitudinal axis 28 (FIG. 2B) between a bottom port 30 defined in the bottom cover 22 and an opposed top port 32 defined in the top cover 24. The bottom port 30 and the top port 32 may be openings. For example, the fluid may be introduced in the container 12 from the bottom port 30 and/or the top port 32 and evacuated from the bottom port 30 and/or the top port 32, and vice versa. A fluid source (not shown) may provide the fluid to the container 12. The fluid may be pressurized and injected into the container 12. The pump 14 may pressurize the fluid. A vacuum pump may be connected to the top port 32 to evacuate the fluid from the container 12.

The housing 20 may have a sidewall 34 extending around the longitudinal axis 28 from the bottom cover 22 to the top cover 24. The housing 20 may have a cylindrical shape. In some embodiments, the housing 20 may have an oval shape.

The container 12 has an internal chamber defined therein. The internal chamber may be divided into sub-chambers. For example, the container 12 may have a main chamber 36, a bottom chamber 38, and a top chamber 40. The main chamber 36 is disposed between the bottom chamber 38 and the top chamber 40. The main chamber 36 is defined in the housing 20 such that the sidewall 34 at least partially delimits the main chamber 36. The main chamber 36 is adapted to contain therein the treatment particles. The bottom chamber 38 is defined between the main chamber 36 and the bottom cover 22, and the top chamber 40 is defined between the main chamber 36 and the top cover 24. In some embodiments, the bottom chamber 38 is free from the treatment particles. Similarly, the top chamber 40 may be free from the treatment particles.

The container 12 includes a bottom plate 42 disposed therein at a predetermined height above the bottom port 30 such that the bottom chamber 38 may be defined between the bottom plate 42 and the bottom port 30. The bottom plate 42 may be disposed perpendicular to the longitudinal axis 28. The bottom plate 42 delimits a bottom portion of the main chamber 36. The bottom plate 42 may extend across the sidewall 34 of the housing 20. In other words, a periphery of the bottom plate 42 may be in contact with the sidewall 34. The bottom plate 42 may form a common divider between the main chamber 36 and the bottom chamber 38.

The container 12 may include a top plate 44 disposed therein at a predetermined depth below the top port 32 such that the top chamber 40 may be defined between the top plate 44 and the top port 32. The top plate 44 may be disposed perpendicular to the longitudinal axis 28. The top plate 44 delimits a top portion of the main chamber 36. The top plate 44 may extend across the sidewall 34 of the housing 20. In other words, a periphery of the top plate 44 may be in contact with the sidewall 34. The top plate 44 may form a common divider between the main chamber 36 and the top chamber 40.

The diffusers 26 may include bottom diffusers 26A that extend from the bottom plate 42 into the main chamber 36. In some embodiments, each diffuser 26 has a diffuser tube section 46 that projects upwardly from the bottom plate 42 into the main chamber 36. A predetermined height of the diffuser tube section 46 may be determined relative to the size and shape of the container 12. The predetermined height of the diffuser tube section 46 may depend on the selection of the treatment particles. For example, the treatment particles may include the bed of ion-exchange particles disposed above a bed of silex particles. The silex particles are intended to refer to any suitable forms of quartz, flint, stones, or any of the other forms of silica and/or silicate, and the like. The height of the diffuser tube section 46 may extend only within the bed of silex particles. In some embodiments, the diffuser tube section 46 may not extend in the bed of ion-exchange particles. The bottom diffusers 26A may be uniformly distributed over the bottom plate 42.

The bottom diffusers 26A are in fluid flow communication with the bottom chamber 38. In operation, the fluid may be injected into the bottom chamber 38 through the bottom port 30. The fluid may flow into the diffusers 26 to be radially discharged in the main chamber 36.

The container 12 may include top diffusers 26B that extend from the top plate 44 into the main chamber 36. In some embodiments, each diffuser has a diffuser tube section 46 that projects downwardly from the top plate 44 into the main chamber 36. A predetermined depth of the diffuser tube section 46 may be determined relative to the size and shape of the container 12. The predetermined depth of the diffuser tube section 46 may depend on the selection of the treatment particles. For example, the treatment particles may include the bed of silex particles disposed above the bed of ion-exchange particles. The depth of the diffuser tube section 46 may extend only in the bed of silex particles. In some embodiments, the diffuser tube section 46 of the top diffusers 26B may not extend in the bed of ion-exchange particles. The top diffusers 26B may be uniformly distributed over the top plate 44.

Figure 3A:
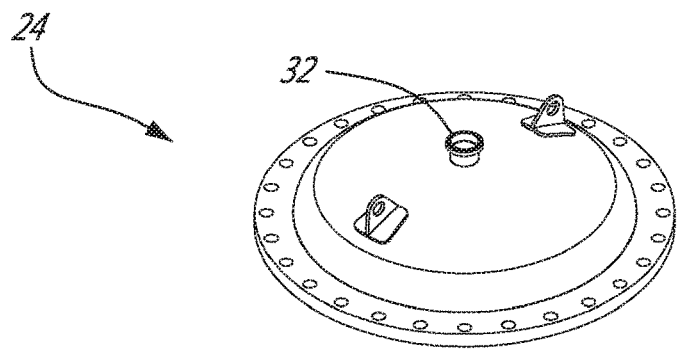
FIG. 3A is a perspective view of a top cover of the container.
Figure 3B:
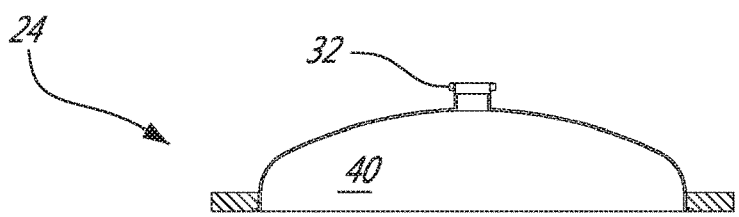
FIG. 3B is a cross-sectional view of the top cover.

Referring to FIGS. 3A-3B, the top cover 24 is shown. The top port 32 is positioned in a center of the top cover 24. It is understood that other configurations of the top port 32 may be employed. The bottom cover 22 may be similar to the top cover 24.

Figure 4A:
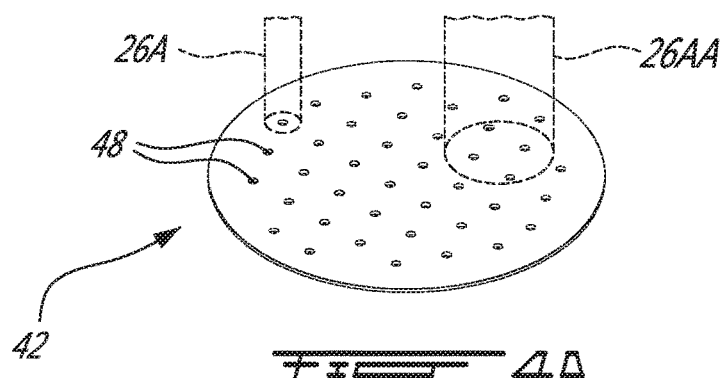
FIG. 4A is a perspective view of the bottom plate.
Figure 4B:
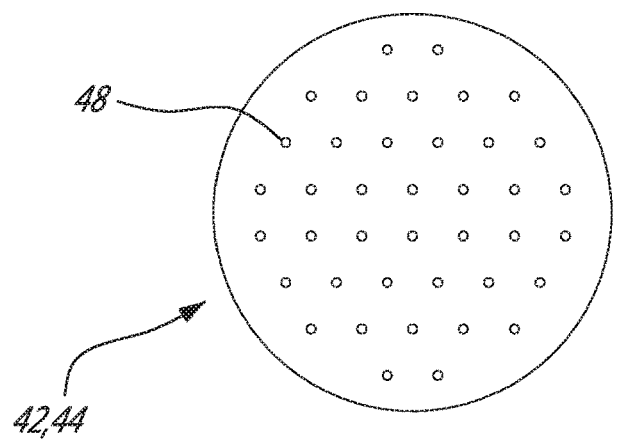
FIG. 4B is a top view of the bottom plate.

Referring to FIGS. 4A-4B, the bottom plate 42 is shown. In some embodiments, the bottom plate 42 is perforated and includes openings 48 defined therethrough. Each opening 48 may receive a corresponding diffuser 26. In other words, the corresponding diffuser 26 may extend through the bottom plate 42 through a respective opening 48.

In some embodiments, each one of the openings 48 of the bottom plate 42 is in fluid flow communication with a corresponding diffuser tube section 46. That is, two or more openings 48 may be in fluid flow communication with the same diffuser tube section 46. For example, in the embodiment shown in FIG. 4A, the diffuser 26AA expands over four openings 48. The diffuser 26A expands over one opening 48.

The bottom plate 42 may have a circular shape. In other embodiments, the bottom plate 42 may have a different shape, such as oval, and the like.

A density of the diffusers 26 may be defined by a number of the diffusers 26 per unit area of the bottom plate 42. In some embodiments, the density of the diffusers 26 is between a minimum value and a maximum value of diffusers 26 per meter square (number of diffusers/m$^2$). In some embodiments, the density is between 50 and 70 diffusers/m$^2$. In some embodiments, the density is between 60 and 65 diffusers/m$^2$. In some embodiments, the density is, or about, 62.5 diffusers/m$^2$. The density of the diffusers may be 0.016 m$^2$/diffuser tube.

For example, for a diameter of 900 millimetres (mm) of the bottom plate 42, the area of the bottom plate 42 is 0.64 m$^2$. Thus, to maintain a density of 62.5 diffusers/m$^2$, 40 diffusers 26 may be used and uniformly distributed over the bottom plate 42.

Referring to FIG. 5A, a diffuser 26 is shown in accordance to some embodiments. The diffuser tube section 46 has a root opening 50 at one end and a closed opposite end 52. The diffuser tube section 46 may be in fluid flow communication with the bottom chamber 38 through the root opening 50. The diffuser tube section 46 may have radial openings 54 circumferentially distributed along a length thereof between the bottom plate 42 and the closed end 52. A flow path of the fluid may be defined from the root opening 50 to the radial openings 54.

The diffuser 26 may include the diffuser tube section 46 and a root tube section 56. The root tube section 56 is intended to refer to any suitable tube to reach the fluid within the bottom chamber 38. The root tube section 56 may project from the bottom plate 42 into the bottom chamber 38. The root tube section 56 may be in fluid flow communication with the bottom chamber 38 through another root opening 50A.

The diffuser 26 may be sized to provide a pressure drop therethrough. The pressure drop may be between 1 and 3 bars for a flow of the fluid at a volumetric flow rate between 60 and 70 meter cube per hour (m$^3$/h). The diffusers 26 may be sized and shaped to uniformly distribute the fluid in the bed of silex particles.

The diffuser tube section 46 may have a diameter that is between 14 mm and 17 mm. The height of the diffuser tube section 46 may be about 50 mm. It is understood that other sizes of the diameter and the height may be used.

A flowrate of the fluid per diffuser 26 may vary between 25 litres per hour (L/h) and 1 500 L/h. The pump 14 may vary the flowrate of the fluid flowing to the diffusers 26.

The diffuser 26 may be made from a stainless steel, titanium alloy, or a combination of stainless steel and titanium alloy. For example, the diffuser 26 may be made from a titanium loaded stainless steel. The material of the diffuser 26 may be known as "Alloy 316 Ti".

Referring to FIG. 5B, an enlarged view of a portion of the diffuser tube section 46 is shown in accordance to some embodiments. The radial openings 54 may have V-shaped openings. In some embodiments, the V-shaped openings 54 may block the silex particles 58 from entering into the diffusers 26. The size of the silex particle 58 may be greater than the size of the radial opening 54.

Referring to FIG. 6, the main chamber 36 defined within the housing 20 is shown. The housing 20 may have a height along the longitudinal axis 28 and a diameter extending in a plane perpendicular to the longitudinal axis 28. The shape of the housing 20 may be referred to as "super square". The term super square is intended to refer to a shape of the housing 20 where the values of the height and the diameter are equal, or are near each other. For example, a ratio of the height over the diameter may be between 0.75 and 1.25. In some embodiments, the ratio of the height over the diameter is between 0.8 and 1.2. In some embodiments, the ratio of the height over the diameter is between 0.9 and 1.1. In some embodiments, the ratio of the height over the diameter is, or about, 1.

In use, the treatment particles may be provided inside the main chamber 36 to a filling height that extends from the bottom plate 42 toward the top plate. The filling height may be between 50% and 100% of the total height of the housing 20. The treatment particles may expand in volume during the treatment of the fluid. The container 12 may be sold separately from the treatment particles. The container 12 may sold with the bed of silex particles 58 and the bed of ion-exchange particles.

The ion-exchange system 10 may include the container 12 with an identical bottom half and top half. That is, for example, the top plate 44 and top diffusers 26B mirror the bottom plate 42 and bottom diffusers 26A. In some embodiments, a regenerating or washing fluid may be used to regenerate or wash the ion-exchange particles. For example, after treating the fluid, the ion-exchange particles may be washed to remove the molecules that were separated from the fluid, the molecules retained by the ion-exchange particles, or both.

In some operations of the ion chromatography, a method may be provided for treating the fluid. The method may include uniformly distributing the fluid in the bed of silex particles 58 in the container 12, raising the fluid from the bed of silex particles into, and through, the bed of ion-exchange particles, and evacuating or retrieving the fluid from the container 12. The method may include a reverse washing flow from the top port 32 to the bottom port 30 to wash and regenerate the ion-exchange particles.

Referring to FIG. 7, a cross-section of the container 12 is shown. In the embodiment shown in FIG. 7, the bottom chamber 38 and the top chamber 40 are free from the ion-exchange particles 60. In operation, during a treatment cycle, the fluid may flow through the container 12 from the bottom port 30, to the bottom chamber 38, to the main chamber 36, to the top chamber 40, and flow out of the container 12 through the top port 32. For example, the fluid may enter the housing 20 through the bottom port 30. The fluid may flow into the bottom diffusers 26A. The bottom diffusers 26A may uniformly discharge the fluid in the bed of silex particles 58. The fluid may rise from the bed of silex particles 58 into the bed of ion-exchange particles 60. The fluid may flow into the top diffusers 26B. The fluid may exit the container through the top port 32.

In operation, during a washing cycle, the fluid may flow through the container 12 from the top port 32, to the top chamber 40, to the main chamber 36, to the bottom chamber 38, and flow out of the container 12 through the bottom port 30. For example, the fluid may enter the housing 20 through the top port 32. The fluid may flow into the top diffusers 26B. The top diffusers 26B may uniformly discharge the fluid in the bed of silex particles 58. The fluid may flow from the bed of silex particles 58 into the bed of ion-exchange particles 60. The fluid may flow into the bottom diffusers 26A. The fluid may exit the container through the bottom port 30.

Embodiments disclosed herein include:

Embodiment A: a container for treating a fluid with an ion-exchange system, the container comprising
  a housing extending in an upright position along a longitudinal axis between a bottom port and an opposed top port, the housing having an internal chamber defined therein;
  a bottom plate disposed in the internal chamber perpendicular to the longitudinal axis at a predetermined height above the bottom port and having a plurality of openings defined therethrough, the bottom plate dividing the internal chamber between a main chamber and a bottom chamber, the bottom chamber defined between the bottom plate and the bottom port; and
  a plurality of diffusers in fluid flow communication with the bottom chamber extending from the bottom plate into the main chamber, each one of the plurality of diffusers being received in a respective one of the plurality of openings of the bottom plate and having a diffuser tube section projecting upwardly from the bottom plate and being in fluid flow communication with the bottom chamber, the diffuser tube section having radial openings circumferentially distributed along a length thereof to radially discharge the fluid in the main chamber.

Embodiment B: an ion-exchange system for treating a fluid to remove particles, the ion-exchange system comprising
  a container extending in an upright position along a longitudinal axis between a bottom port and an opposed top port, the container having an internal chamber between the bottom port and the top port;
  top and bottom plates disposed in the internal chamber of the container, a bottom chamber defined between the bottom port and the bottom plate, a top chamber defined between the top plate and the top port, and a main chamber defined between the top and bottom plates;
  treatment particles disposed in the internal chamber to treat the fluid, the treatment particles including a bed of silex particles disposed on the bottom plate and a bed of ion-exchange particles disposed on top of the bed of silex particles; and
  a plurality of bottom diffusers extending through the bottom plate, each one of the plurality of bottom diffusers having a diffuser tube section projecting into the bed of silex particles, the diffuser tube section having a root opening at a first end thereof in fluid flow communication with the bottom chamber and a closed second end opposite the first end, and radial diffuser openings circumferentially distributed along a length of the diffuser tube section to radially discharge the fluid in the main chamber and to uniformly distribute the fluid in the bed of silex particles,
  wherein the top chamber is free of the treatment particles above the top plate and the bottom chamber is free of the treatment particles below the bottom plate relative to the longitudinal axis.

Embodiment C: an ion-exchange system for treating a fluid to remove particles, the ion-exchange system comprising
  a container section having a cylindrical shape and extending along a longitudinal axis between a bottom plate and a top plate, each one of the bottom and top plates having a plurality of openings defined therethrough the container section having a main chamber defined therein between the bottom plate and the top plate, the container section having a height along the longitudinal axis and a diameter extending in a plane perpendicular to the longitudinal axis, and a ratio of the height over the diameter is between 0.75 and 1.25; and
  a plurality of bottom diffusers extending through the bottom plate, each one of the plurality of bottom diffusers having a diffuser tube section projecting into the main chamber parallel to the longitudinal axis through a respective one of the plurality of openings of the bottom plate, each one of the plurality of bottom diffusers having a root tube section adapted to be in fluid flow communication with a source of the fluid, and radial diffuser openings circumferentially distributed along a length of the diffuser tube section to radially discharge the fluid in the container section, a density of the plurality of bottom diffusers being between 50 and 70, the density of the plurality of bottom diffusers being defined as a number of the plurality of bottom diffusers per meter square of the bottom plate.

Embodiment D: an ion chromatography method for treating a fluid with ion-exchange treatment particles disposed in a container, the method comprising
  uniformly distributing the fluid in a bed of silex particles of the treatment particles through a plurality of bottom diffusers;

raising the fluid from the bed of silex particles into, and through, a bed of ion-exchange particles of the treatment particles; and evacuating the fluid from the container.

Embodiments A, B, C and/or D may include any of the following elements in any combination.

In addition, the following combinations are contemplated:

Element 1: Embodiments A wherein the container includes a top plate disposed inside the housing perpendicular to the longitudinal axis at a predetermined depth below the top port, the top plate delimiting a top portion of the main chamber such that a top chamber being defined between the top plate and the top port.

Element 2: Element 1 wherein a second set of the plurality of diffusers extend from the top perforated plate into the main chamber, each one of the plurality of diffusers of the second set having the diffuser tube section projecting downwardly from the top plate and being in fluid flow communication with the top chamber.

Element 3: Embodiments A, or any one of elements 1 and 2, wherein at least one of the plurality of diffusers has a root tube section projecting from the bottom plate into the bottom chamber, the root tube section being in fluid flow communication with the diffuser tube section and the bottom chamber.

Element 4: Embodiments A, or any one of elements 1 to 3, wherein the main chamber has a height along the longitudinal axis and a diameter extending in a plane perpendicular to the longitudinal axis, and a ratio of the height over the diameter is between 0.75 and 1.25.

Element 5: Element 4 wherein the ratio of the height over the diameter is between 0.8 and 1.2.

Element 6: Element 4 wherein the ratio of the height over the diameter is between 0.9 and 1.1.

Element 7: Element 4 wherein the ratio of the height over the diameter is 1.

Element 8: Embodiments A, or any one of elements 1 to 7, wherein a density of the plurality of diffusers is between 50 and 70, the density of the plurality of diffusers being defined as a number of the plurality of diffusers per meter square of the bottom plate.

Element 9: Element 8 wherein the density of the plurality of diffusers per meter square is between 60 and 65.

Element 10: Element 8 wherein the density of the plurality of diffusers per meter square is 62.5.

Element 11: Embodiments A, or any one of elements 1 to 10, wherein each one of the plurality of diffusers is adapted to provide a pressure drop therethrough, the pressure drop being between 1 and 3 bars for a flow of the fluid at a volumetric flow rate between 60 and 70 meter cube per hour.

Element 12: Embodiments A, or any one of elements 1 to 11, wherein a length of the diffuser tube section is adapted to extend only in a bed of silex particles.

Element 13: Embodiments A, or any one of elements 1 to 11, wherein the radial openings of the diffuser tube section are V-shaped such that a smallest cross-section of one of the radial openings delimits the diffuser tube section within the main chamber.

Element 14: Embodiments B, wherein a plurality of top diffusers extending from the top plate into the main chamber, each one of the plurality of top diffusers having the diffuser tube section projecting downwardly from the top plate and being in fluid flow communication with the top chamber.

Element 15: Embodiments B, or element 14 at least one of the plurality of bottom diffusers has a root tube section projecting from the bottom plate into the bottom chamber, the root tube section being in fluid flow communication with the diffuser tube section and the bottom chamber.

Element 16: Embodiments B, or any one of elements 14 to 15 wherein a density of the plurality of bottom diffusers is between 50 and 70, the density of the plurality of bottom diffusers being defined as a number of the plurality of bottom diffusers per meter square of the bottom plate.

Element 17: Embodiments B, or any one of elements 14 to 16 wherein the main chamber has a height along the longitudinal axis and a diameter extending in a plane perpendicular to the longitudinal axis, and a ratio of the height over the diameter is between 0.75 and 1.25.

Element 18: Embodiments B, or any one of elements 14 to 16 wherein the ratio of the height over the diameter is between 0.8 and 1.2.

Element 19: Embodiments B, or any one of elements 14 to 16 wherein the ratio of the height over the diameter is between 0.9 and 1.1.

Element 20: Embodiments B, or any one of elements 14 to 16 wherein the ratio of the height over the diameter is about 1.

Element 21: Embodiments B, or any one of elements 14 to 20 wherein a density of the plurality of bottom diffusers is between 50 and 70, the density of the plurality of bottom diffusers being defined as a number of the plurality of bottom diffusers per meter square of the bottom plate.

Element 23: Embodiments B, or any one of elements 14 to 20 wherein the density of the plurality of diffusers per meter square is between 60 and 65.

Element 24: Embodiments B, or any one of elements 14 to 20, wherein the density of the plurality of diffusers per meter square is 62.5.

Element 25: Embodiments B, or any one of elements 14 to 24, wherein each one of the plurality of bottom diffusers is adapted to provide a pressure drop therethrough, the pressure drop being between 1 and 3 bars for a flow of the fluid at a volumetric flow rate between 60 and 70 meter cube per hour.

Element 26: Embodiments B, or any one of elements 14 to 25, wherein a length of the diffuser tube section extend only in the bed of silex particles.

Element 27: Embodiments B, or any one of elements 14 to 26, wherein the radial openings of the diffuser tube section are V-shaped such that a smallest crosssection of one of the radial openings delimits the diffuser tube section within the main chamber.

Element 28: Embodiments C, comprising a plurality of top diffusers extending through the top plate, each one of the plurality of top diffusers having the diffuser tube section projecting into the main chamber parallel to the longitudinal axis through a respective one of the plurality of openings of the top plate.

Element 29: Element 28 wherein a density of the plurality of top diffusers being between 50 and 70, the density of the plurality of top diffusers being defined as a number of the plurality of top diffusers per meter square of the top plate.

Element 30: Embodiments C, or any one of elements 28 to 29, wherein each one of the plurality of bottom diffusers is adapted to provide a pressure drop therethrough, the pressure drop being between 1 and 3 bars for a flow of the fluid at a volumetric flow rate between 60 and 70 meter cube per hour.

Element 31: Embodiments C, or any one of elements 28 to 30, wherein each one of the plurality of top diffusers is adapted to provide a pressure drop therethrough, the pressure drop being between 1 and 3 bars for a flow of the fluid at a volumetric flow rate between 60 and 70 meter cube per hour.

Element 32: Embodiments D, further comprising, subsequently after evacuating the fluid from the container, distributing a washing fluid in the bed of ion-exchange particles through a plurality of top diffusers.

The above description is meant to be exemplary only, and one skilled in the art will recognize that changes may be made to the embodiments described without departing from the scope of the invention disclosed. For example, the bottom diffusers may be identical to the top diffusers. The bottom plate 42 may be identical to the top plate.

Still other modifications which fall within the scope of the present invention will be apparent to those skilled in the art, in light of a review of this disclosure, and such modifications are intended to fall within the appended claims.

The invention claimed is:

1. A container for treating a fluid with an ion-exchange system, the container comprising:
   a housing extending in an upright position along a longitudinal axis between a bottom port and an opposed top port, the housing having an internal chamber defined therein;
   a bottom plate disposed in the internal chamber perpendicular to the longitudinal axis at a predetermined height above the bottom port and having a plurality of openings defined therethrough, the bottom plate dividing the internal chamber between a main chamber and a bottom chamber, the bottom chamber defined between the bottom plate and the bottom port, the main chamber being adapted to contain treatment particles; and
   a plurality of diffusers in fluid flow communication with the bottom chamber extending from the bottom plate into the main chamber, each one of the plurality of diffusers being received in a respective one of the plurality of openings of the bottom plate and having a diffuser tube section projecting upwardly from the bottom plate and being in fluid flow communication with the bottom chamber, each of the diffuser tube sections having a plurality of radial openings circumferentially distributed along a length thereof to radially discharge the fluid in the main chamber, and wherein the internal chamber is adapted to retain silicone dioxide particles,
   wherein a density of the plurality of diffusers is between 50 and 70, the density of the plurality of diffusers being defined as a number of the plurality of diffusers per meter square of the bottom plate; and
   wherein the main chamber has a height along the longitudinal axis and a diameter extending in a plane perpendicular to the longitudinal axis, and a ratio of the height over the diameter is between 0.75 and 1.25.

2. The container as defined in claim 1, further comprises a bed made of the silicone dioxide particles.

3. The container as defined in claim 2, wherein a length of the diffuser tube section is adapted to extend only in the bed of silicone dioxide particles.

4. An ion-exchange system for treating a fluid to remove particles, the ion-exchange system comprising:
   a container extending in an upright position along a longitudinal axis between a bottom port and an opposed top port, the container having an internal chamber between the bottom port and the top port;
   top and bottom plates disposed in the internal chamber of the container, a bottom chamber defined between the bottom port and the bottom plate, a top chamber defined between the top plate and the top port, and a main chamber defined between the top and bottom plates;
   treatment particles disposed in the internal chamber to treat the fluid, the treatment particles including a bed of silicone dioxide particles disposed on the bottom plate and a bed of ion-exchange particles disposed on top of the bed of silicone dioxide particles; and
   a plurality of bottom diffusers extending through the bottom plate, each one of the plurality of bottom diffusers having a diffuser tube section projecting into the bed of silicone dioxide particles, the diffuser tube section having a root opening at a first end thereof in fluid flow communication with the bottom chamber and a closed second end opposite the first end, and radial diffuser openings circumferentially distributed along a length of the diffuser tube section to radially discharge the fluid in the main chamber and to uniformly distribute the fluid in the bed of silicone dioxide particles, wherein
   the top chamber is free of the treatment particles above the top plate and the bottom chamber is free of the treatment particles below the bottom plate relative to the longitudinal axis;
   wherein a density of the plurality of diffusers is between 50 and 70, the density of the plurality of diffusers being defined as a number of the plurality of diffusers per meter square of the bottom plate; and
   wherein the main chamber has a height along the longitudinal axis and a diameter extending in a plane perpendicular to the longitudinal axis, and a ratio of the height over the diameter is between 0.75 and 1.25.

5. The ion-exchange system as defined in claim 4, (wherein each one of the plurality of bottom diffusers is adapted to provide a pressure drop therethrough, the pressure drop being between 1 and 3 bars for a flow of the fluid at a volumetric flow rate between 60 and 70 meter cube per hour.

6. The ion-exchange system as defined in claim 4, wherein a length of each of the diffuser tube sections extends only in the bed of silicone dioxide particles.

7. An ion-exchange system for treating a fluid to capture organic acids, the ion-exchange system comprising:
   a container section having a cylindrical shape and extending along a longitudinal axis between a bottom plate and a top plate, each one of the bottom and top plates having a plurality of openings defined therethrough the container section having a main chamber defined therein between the bottom plate and the top plate, the container section having a height along the longitudinal axis and a diameter extending in a plane perpendicular to the longitudinal axis, and a ratio of the height over the diameter is between 0.75 and 1.25; and
   a plurality of bottom diffusers extending through the bottom plate, each one of the plurality of bottom diffusers having a diffuser tube section projecting into the main chamber parallel to the longitudinal axis through a respective one of the plurality of openings of the bottom plate, each one of the plurality of bottom diffusers having a root tube section adapted to be in fluid flow communication with a source of the fluid, and radial diffuser openings circumferentially distributed along a length of the diffuser tube section to radially discharge the fluid in the container section, a density of the plurality of bottom diffusers being between 50 and 70, the density of the plurality of bottom diffusers being defined as a number of the plurality of bottom diffusers per meter square of the bottom plate, wherein the internal chamber is adapted to retain silicone dioxide particles.

8. The ion-exchange system as defined in claim 7, comprising a plurality of top diffusers extending through the top plate, each one of the plurality of top diffusers having the diffuser tube section projecting into the main chamber parallel to the longitudinal axis through a respective one of the plurality of openings of the top plate.

9. The ion-exchange system as defined in claim 8, wherein a density of the plurality of top diffusers is between 50 and 70, the density of the plurality of top diffusers being defined as a number of the plurality of top diffusers per meter square of the top plate.

* * * * *